US012675674B2

(12) United States Patent
Sumeet et al.

(10) Patent No.: US 12,675,674 B2
(45) Date of Patent: Jul. 7, 2026

(54) METHOD AND SYSTEM FOR LATENCY OPTIMIZED HETEROGENEOUS DEPLOYMENT OF CONVOLUTIONAL NEURAL NETWORK

(71) Applicant: Tata Consultancy Services Limited, Mumbai (IN)

(72) Inventors: Nupur Sumeet, Thane West (IN); Manoj Karunakaran Nambiar, Thane West (IN); Rekha Singhal, Thane West (IN); Karan Rawat, New Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 560 days.

(21) Appl. No.: 18/227,061

(22) Filed: Jul. 27, 2023

(65) Prior Publication Data

US 2024/0062045 A1 Feb. 22, 2024

(30) Foreign Application Priority Data

Aug. 22, 2022 (IN) .............................. 202221047784

(51) Int. Cl.
*G06F 16/00* (2019.01)
*G06N 3/0464* (2023.01)
(52) U.S. Cl.
CPC .................................. *G06N 3/0464* (2023.01)
(58) Field of Classification Search
CPC .... G06N 3/0464; G06N 3/048; G06N 3/0985; G06N 3/082; G06N 3/063;
(Continued)

(56) References Cited

U.S. PATENT DOCUMENTS 6,430,615 B1 * 8/2002 Hellerstein ......... H04L 67/1029
709/224
11,374,953 B2 * 6/2022 Givental ................. G06F 16/55
(Continued)

OTHER PUBLICATIONS

Blott et al., "Evaluation of Optimized CNNs on Heterogeneous Accelerators Using a Novel Benchmarking Approach," IEEE Transactions on Computers, 70(10) (2021).
(Continued)

*Primary Examiner* — Noosha Arjomandi
(74) *Attorney, Agent, or Firm* — Finnegan, Henderson, Farabow, Garrett & Dunner LLP

(57) ABSTRACT

This disclosure relates generally to a method and system for latency optimized heterogeneous deployment of convolutional neural network (CNN). State-of-the-art methods for optimal deployment of convolutional neural network provide a reasonable accuracy. However, for unseen networks the same level of accuracy is not attained. The disclosed method provides an automated and unified framework for the convolutional neural network (CNN) that optimally partitions the CNN and maps these partitions to hardware accelerators yielding a latency optimized deployment configuration. The method provides an optimal partitioning of the CNN for deployment on heterogeneous hardware platforms by searching network partition and hardware pair optimized for latency while including communication cost between hardware. The method employs performance model-based optimization algorithm to optimally deploy components of a deep learning pipeline across right heterogeneous hardware for high performance.

19 Claims, 5 Drawing Sheets

(58) Field of Classification Search

CPC ....... G06F 2209/501; G06F 2209/5017; G06F 2209/509; G06F 9/5044

See application file for complete search history.

(56) References Cited

U.S. PATENT DOCUMENTS

| | | | | |
|---|---|---|---|---|
| 11,646,014 | B1 * | 5/2023 | Harsola | G10L 15/16 |
| | | | | 704/232 |
| 11,854,285 | B2 * | 12/2023 | Krishnamurthy | G06V 10/82 |
| 12,061,961 | B2 * | 8/2024 | Fuerst | G06N 3/09 |
| 12,287,868 | B2 * | 4/2025 | Liu | G06F 21/6218 |
| 12,468,951 | B2 * | 11/2025 | Ryan | G06N 3/084 |
| 2015/0128263 | A1 * | 5/2015 | Raugas | G06F 21/552 |
| | | | | 726/23 |
| 2017/0276571 | A1 * | 9/2017 | Vitullo | G06Q 10/06 |
| 2019/0045207 | A1 * | 2/2019 | Chen | G06F 21/44 |
| 2020/0034733 | A1 * | 1/2020 | Pang | G06F 16/2477 |
| 2020/0116522 | A1 * | 4/2020 | Paul | G01D 3/08 |
| 2021/0035011 | A1 * | 2/2021 | Arnold | G06F 11/0709 |
| 2021/0073060 | A1 * | 3/2021 | Grant | G06F 11/3006 |
| 2021/0133577 | A1 * | 5/2021 | Srinivasan | G06N 3/045 |
| 2021/0150341 | A1 * | 5/2021 | Dalli | G06N 3/092 |
| 2021/0209486 | A1 * | 7/2021 | Fan | G06N 20/20 |
| 2021/0232915 | A1 * | 7/2021 | Dalli | G06N 3/045 |
| 2021/0248498 | A1 * | 8/2021 | Pang | G06F 18/214 |
| 2021/0256377 | A1 * | 8/2021 | Dalli | G06N 20/00 |
| 2021/0279606 | A1 * | 9/2021 | Srinivasan | G06N 3/091 |
| 2021/0342677 | A1 * | 11/2021 | Dalli | G06N 3/092 |
| 2021/0344695 | A1 * | 11/2021 | Palani | G06F 16/285 |
| 2021/0365770 | A1 * | 11/2021 | Bhatia | G05B 19/41885 |
| 2022/0230013 | A1 * | 7/2022 | Krishnamurthy | G06N 3/096 |
| 2022/0253699 | A1 * | 8/2022 | Hoshen | G06N 3/09 |
| 2023/0120896 | A1 * | 4/2023 | Bhattacharyya | G06F 16/2365 |
| | | | | 707/690 |
| 2023/0316105 | A1 * | 10/2023 | Nguyen | G06N 20/00 |
| | | | | 706/46 |
| 2024/0062045 | A1 * | 2/2024 | Sumeet | G06F 9/5044 |
| 2025/0116741 | A1 * | 4/2025 | Shirai | G01R 33/56545 |
| 2025/0307656 | A1 * | 10/2025 | Das | G06N 3/063 |
| 2025/0363359 | A1 * | 11/2025 | Galvin | G06N 3/045 |
| 2026/0076551 | A1 * | 3/2026 | Lee | A61B 3/04 |

OTHER PUBLICATIONS

De Oliveira et al., "Partitioning Convolutional Neural Networks to Maximize the Inference Rate on Constrained IoT Devices," Future Internet, 11 (2019).

Lee et al., "HELP: Hardware-Adaptive Efficient Latency Prediction for NAS via Meta-Learning," Conference on Neural Information Processing Systems (2021).

Tuli et al., "SplitPlace: AI Augmented Splitting and Placement of Large-Scale Neural Networks in Mobile Edge Environments," IEEE Transactions on Mobile Computing (2022).

* cited by examiner

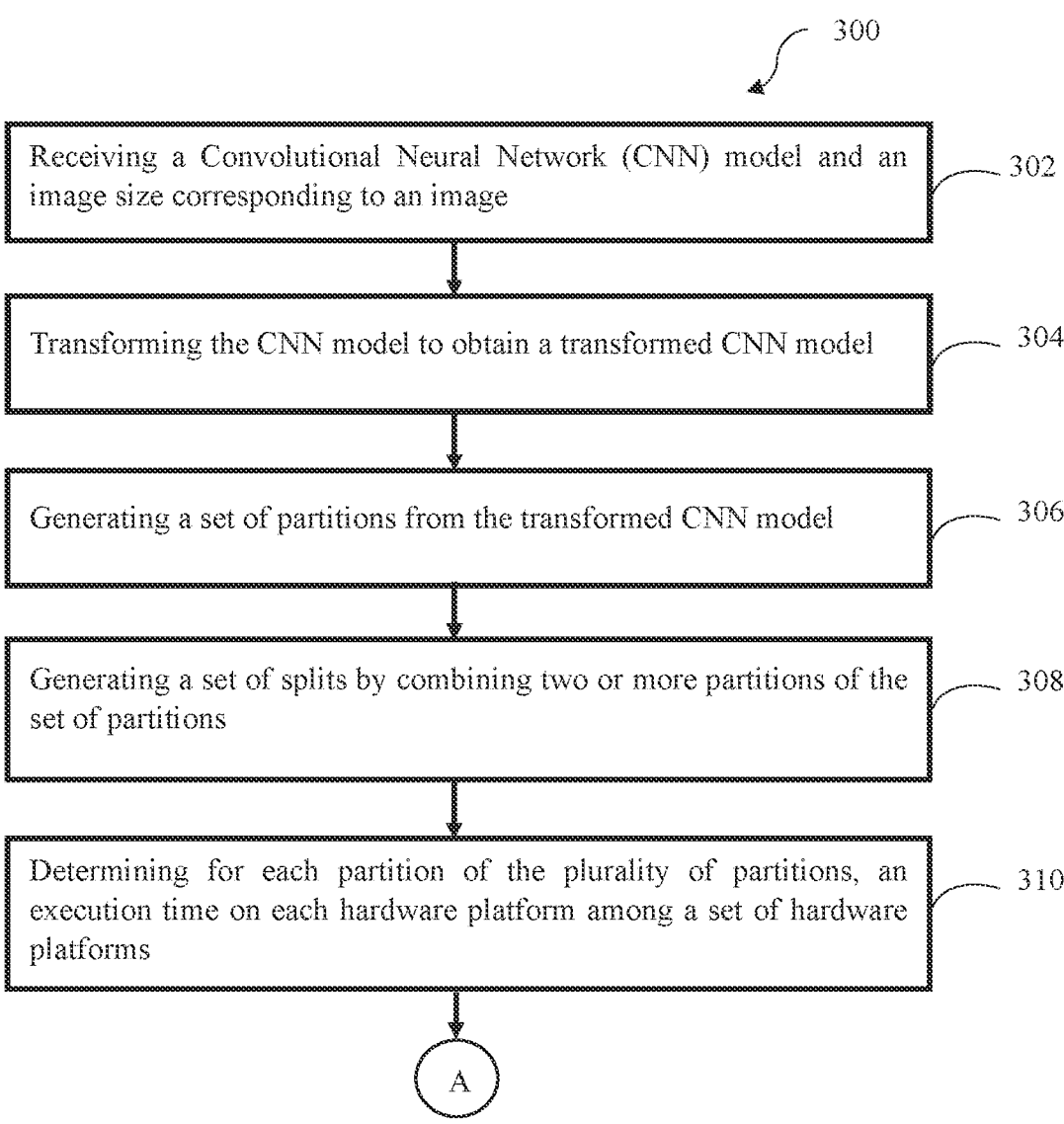

300

Receiving a Convolutional Neural Network (CNN) model and an image size corresponding to an image — 302

Transforming the CNN model to obtain a transformed CNN model — 304

Generating a set of partitions from the transformed CNN model — 306

Generating a set of splits by combining two or more partitions of the set of partitions — 308

Determining for each partition of the plurality of partitions, an execution time on each hardware platform among a set of hardware platforms — 310

Determining for each partition of the plurality of partitions, a heterogeneous hardware latency and a homogeneous hardware latency    312

Generating an optimal heterogeneous hardware latency    314

Generating an optimal homogeneous hardware latency    316

METHOD AND SYSTEM FOR LATENCY OPTIMIZED HETEROGENEOUS DEPLOYMENT OF CONVOLUTIONAL NEURAL NETWORK

PRIORITY CLAIM

This U.S. patent application claims priority under 35 U.S.C. § 119 to: Indian Patent Application No. 202221047784, filed on Aug. 22, 2022. The entire contents of the aforementioned application are incorporated herein by reference.

TECHNICAL FIELD

The disclosure herein generally relates to the field of deployment of convolutional neural network and more particularly, to a method and a system for latency optimized heterogeneous deployment of convolutional neural network.

BACKGROUND

Enabling performance-efficient Neural Network (NN) processing on resource constrained devices has spurred the development of algorithmically efficient neural network architectures as well as a myriad of specialized hardware accelerators architected to efficiently execute the kernels commonly found in deep neural networks. The hardware architectures have high variation in their architectural features including distinct micro-architectures, memory and compute capabilities. This further affects their suitability for NN processing. On the other hand, the NN models exert different computational intensity (computation/bit) requirements on the underlying hardware platforms as the processing progresses from one layer to another. For instance, in convolutional neural network (CNN) the convolutional layer is dominated by computational processing whereas the fully connected neural network layers are heavy on memory access. Additionally, the different amount of data parallelism, data transfer dominating the execution time, computation schedule suggests different tasks belonging to a single application may exhibit properties which make it more suitable for execution on a particular hardware platform. With heterogeneous computing the computational efficiency of the workflow can be improved through acceleration for a subset of workflow tasks on the hardware that suits the computational requirement of the target task. The availability of parallel programming frameworks like Open Computing Language (OpenCL™) and SyCL™ across hardware platforms has further pushed the adoption of heterogeneous systems and accelerators for applications running in production data centers.

However, an efficient heterogeneous deployment requires optimal workload division across hardware platforms. The suitability of hardware platform for a subset of workload is governed by the performance supported by the hardware. At the system level, the interplay of memory capacity, network bandwidth, communication cost etc. add complexity in devising a heterogeneous configuration for deployment and necessitates multiple experiments and access to the set of hardware targeted for heterogeneous deployment. The engineering effort to deploy models on different accelerators (central processing unit (CPU), graphics processing unit (GPU), Field Programmable Gate Arrays (FPGA)) can be bypassed by replacing performance measurement with estimates. Recently, the state-of-the art method for prediction based neural architecture search on graph convolutional network, predict latency of the NASBench201 dataset on various accelerators and reports reasonable accuracy for NASBench201 networks. However, the same level of accuracy cannot be generalized for unseen networks.

Previous works on latency estimators uses Floating point operations per second (FLOPs) as proxy for latency, which is simple but not a direct metric of latency. Recent works on latency predictions use a layer-wise predictor which derives the latency by summing latency measured for each operation in the model individually. The state-of-the-art method for prediction based neural architecture search on graph convolutional network predict latency of the NASBench201 dataset on various devices. It captures the runtime optimizations by learning the representation of model graphs and corresponding latency. However, this model-graph based approach heavily depends on the tested model structures and may not work for many unseen model structures. Another state-of-the-art method opts for kernel level decomposition of the model since the kinds of operators and kernels are stable with a relatively small set despite the increasing number of models. However, this approach has heavy dependency on inference backend and might lose its prediction accuracy when there are significant backend changes. Additionally, the latency prediction is limited to homogeneous implementation only.

SUMMARY

Embodiments of the present disclosure present technological improvements as solutions to one or more of the above-mentioned technical problems recognized by the inventors in conventional systems. For example, in one embodiment, a method for latency optimized heterogeneous deployment of convolutional neural network is provided. The method includes receiving a Convolutional Neural Network (CNN) model and an image size corresponding to an image, wherein the CNN model comprises a set of layers. Further the method includes, transforming the CNN model to obtain a transformed CNN model based on a performance equivalence between an un-supported layer from the set of layers and a performance layer from a neural architecture search database. Furthermore, the method includes, generating a set of partitions from the transformed CNN model by partitioning the set of layers based on a predefined value. Then a set of splits is generated by combining two or more partitions of the set of partitions, wherein each split of the set of splits comprises a plurality of partitions from the set of partitions. Further the method includes, determining for each partition of the plurality of partitions, an execution time on each hardware platform among a set of hardware platforms, based on querying of a performance database. Then for each partition of the plurality of partitions, a heterogeneous hardware latency associated with the set of hardware platforms and a homogeneous hardware latency associated with each hardware platform of the set of hardware platforms using the execution time is determined. Further the method includes, generating an optimal heterogeneous hardware latency associated with the set of hardware platforms from the heterogeneous hardware latency. Finally, the method includes, generating an optimal homogeneous hardware latency associated with each hardware platform of the set of hardware platforms from the homogeneous hardware latency.

In another aspect, a system for latency optimized heterogeneous deployment of convolutional neural network is provided. The system comprises memory storing instructions; one or more communication interfaces; and one or more hardware processors coupled to the memory via the one or more communication interfaces, wherein the one or more hardware processors are configured by the instructions to receive a Convolutional Neural Network (CNN) model and an image size corresponding to an image, wherein the CNN model comprises a set of layers. Further the system includes to transform the CNN model to obtain a transformed CNN model based on a performance equivalence between an un-supported layer from the set of layers and a performance layer from a neural architecture search database. Furthermore, the system includes to generate a set of partitions from the transformed CNN model by partitioning the set of layers based on a predefined value. Then a set of splits is generated by combining two or more partitions of the set of partitions, wherein each split of the set of splits comprises a plurality of partitions from the set of partitions. Further the system includes to determine for each partition of the plurality of partitions, an execution time on each hardware platform among a set of hardware platforms, based on querying of a performance database. Then for each partition of the plurality of partitions, a heterogeneous hardware latency associated with the set of hardware platforms and a homogeneous hardware latency associated with each hardware platform of the set of hardware platforms using the execution time is determined. Further the system includes to generate an optimal heterogeneous hardware latency associated with the set of hardware platforms from the heterogeneous hardware latency. Finally, the system includes to generate an optimal homogeneous hardware latency associated with each hardware platform of the set of hardware platforms from the homogeneous hardware latency.

The CNN model is deployed to a target hardware platform based on the optimal heterogeneous hardware latency and the optimal homogeneous hardware latency. The transformed CNN model is obtained by first identifying the un-supported layer from the set of layers by searching a set of supported layers in the neural architecture search database. Further, the performance layer corresponding to the un-supported layer is identified. And then the un-supported layer with the performance layer to obtain the transformed CNN model is replaced.

The performance layer corresponding to the un-supported layer is identified by first calculating an execution time of the un-supported layer on each hardware platform of the set of hardware platforms based on the image size. Further the performance layer is identified by searching the neural architecture search database.

Each split of the set of splits comprises at most one of each of the layer of the set of layers. An execution time for each partition of the plurality of partitions is determined by searching each partition in the neural architecture search database.

The heterogeneous hardware latency comprises at least one of (i) an execution time for the plurality of partitions or (ii) a communication cost for the plurality of partitions calculated using a set of predefined feature dimensions corresponding to the image. The optimal heterogeneous hardware latency is a minimum heterogeneous hardware latency among the heterogeneous hardware latency. the optimal homogeneous hardware latency is a minimum homogeneous hardware latency among the homogeneous hardware latency associated with each hardware platform.

In yet another aspect, there is provided a computer program product comprising a non-transitory computer readable medium having a computer readable program embodied therein, wherein the computer readable program, when executed on a computing device causes the computing device for latency optimized heterogeneous deployment of convolutional neural network by receiving a Convolutional Neural Network (CNN) model and an image size corresponding to an image, wherein the CNN model comprises a set of layers. Further the computer readable program includes, transforming the CNN model to obtain a transformed CNN model based on a performance equivalence between an un-supported layer from the set of layers and a performance layer from a neural architecture search database. Furthermore, the computer readable program includes, generating a set of partitions from the transformed CNN model by partitioning the set of layers based on a predefined value. Then a set of splits is generated by combining two or more partitions of the set of partitions, wherein each split of the set of splits comprises a plurality of partitions from the set of partitions. Further the computer readable program includes, determining for each partition of the plurality of partitions, an execution time on each hardware platform among a set of hardware platforms, based on querying of a performance database. Then for each partition of the plurality of partitions, a heterogeneous hardware latency associated with the set of hardware platforms and a homogeneous hardware latency associated with each hardware platform of the set of hardware platforms using the execution time is determined. Further the computer readable program includes, generating an optimal heterogeneous hardware latency associated with the set of hardware platforms from the heterogeneous hardware latency. Finally, the computer readable program includes, generating an optimal homogeneous hardware latency associated with each hardware platform of the set of hardware platforms from the homogeneous hardware latency.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B is an exemplary flow diagram for a method for latency optimized heterogeneous deployment of convolutional neural network according to some embodiments of the present disclosure.

DETAILED DESCRIPTION

Figure 1:
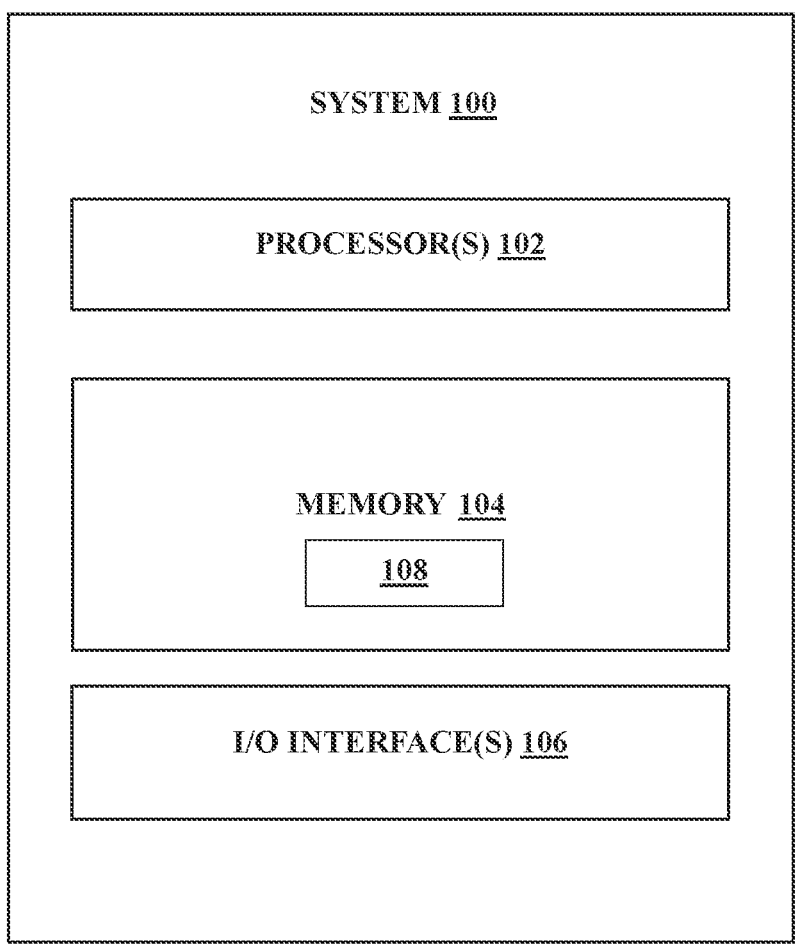
FIG. 1 illustrates an exemplary block diagram of a system for latency optimized heterogeneous deployment of convolutional neural network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and a system for latency optimized heterogeneous deployment of a convolutional neural network (CNN). The method provides an automated and unified framework that helps to optimally partition the CNN and maps these partitions to hardware accelerators yielding a latency optimized deployment configuration. A cell-based performance database for multiple datacenter accelerators is developed which can be used to estimate the processing latency of compute units to identify the optimal CNN partition, accelerator pair for high-performance deployments. The disclosed method provides an optimal partitioning of the CNN for deployment on heterogeneous systems by searching network partition and hardware pair optimized for latency while including communication cost between hardware. A performance database comprising of partition latency modeled on NASBench™ for newer hardware accelerators such as multi-core Intel CPU platform, Xilinx Alveo™ U280 DPU, NVIDIA™ GPUs: A100 and V100 is developed.

Neural architecture search (NAS) replication problem is addressed by providing NASBenchmark datasets that have a fixed search space and provide a unified benchmark for NAS algorithms. NASBench-201 is a benchmark for NAS algorithms including all cell-based NAS methods. The search space includes 15,625 neural cell candidates stacked 5 times in the selected macro skeleton to create model architectures. NASBench-201 provides 3 computation metrics for each architecture which are number of parameters, FLOPs (FLoating-point OPerations per Second), and latency. These metrics are for end-to-end model and not cell-level. Each cell in the search space is represented as a densely connected Directed Acyclic Graph (DAG), obtained by assigning a direction from the $i^{th}$ node to the $j^{th}$ node (i<j) for each edge in an un-directed complete graph. Each edge of DAG is associated with an operation transforming feature map from source node to the target node. The predefined operation has five representative operations: (1) zeroize, (2) skip connection, (3) 1×1 convolution, (4) 3×3 convolution, and (5) 3×3 average pooling layer. Here convolution is an abbreviation of an operation sequence of Rectified Linear Unit (ReLU), convolution, and batch normalization. The DAG has vertices equal to 4 nodes, where each node represents sum of all feature maps transformed through the associated operations of the edges pointing to this node.

The NASBench-201 cells currently support convolution layer with filter sizes—3×3 and 1×1 with unit stride, same padding (1 pixel padding on each side of input) and no dilation. This layer also includes batch normalization and ReLU. Other supported layers include average pooling (3×3) with support for skip connection and dropping an edge through zeroize. The disclosed method supports for up-sampling, fully connected layer, filter size 5×5 with variable stride, padding and dilation for convolution layers.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for latency optimized heterogeneous deployment of convolutional neural network, in accordance with some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an embodiment, the memory 104 includes a plurality of modules 108 (not shown) that can include modules a layer transformation module, a model partitioning module, a matching module, and the like. The plurality of modules includes programs or coded instructions that supplement applications or functions performed by the system 100 for executing different steps involved in the process of latency optimized heterogeneous deployment of convolutional neural network being performed by the system 100. The plurality of modules, amongst other things, can include routines, programs, objects, components, and data structures, which performs particular tasks or implement particular abstract data types. The plurality of modules may also be used as, signal processor(s), node machine(s), logic circuitries, and/or any other device or component that manipulates signals based on operational instructions. Further, the plurality of modules can be used by hardware, by computer-readable instructions executed by the one or more hardware processors 102, or by a combination thereof. The plurality of modules can include various sub-modules (not shown).

Further, the memory 104 may include a database or repository such as a performance database 210. The memory 104 may comprise information pertaining to input(s)/output (s) of each step performed by the processor(s) 102 of the system 100 and methods of the present disclosure. In an embodiment, the database may be external (not shown) to the system 100 and coupled via the I/O interface 106.

Figure 2:
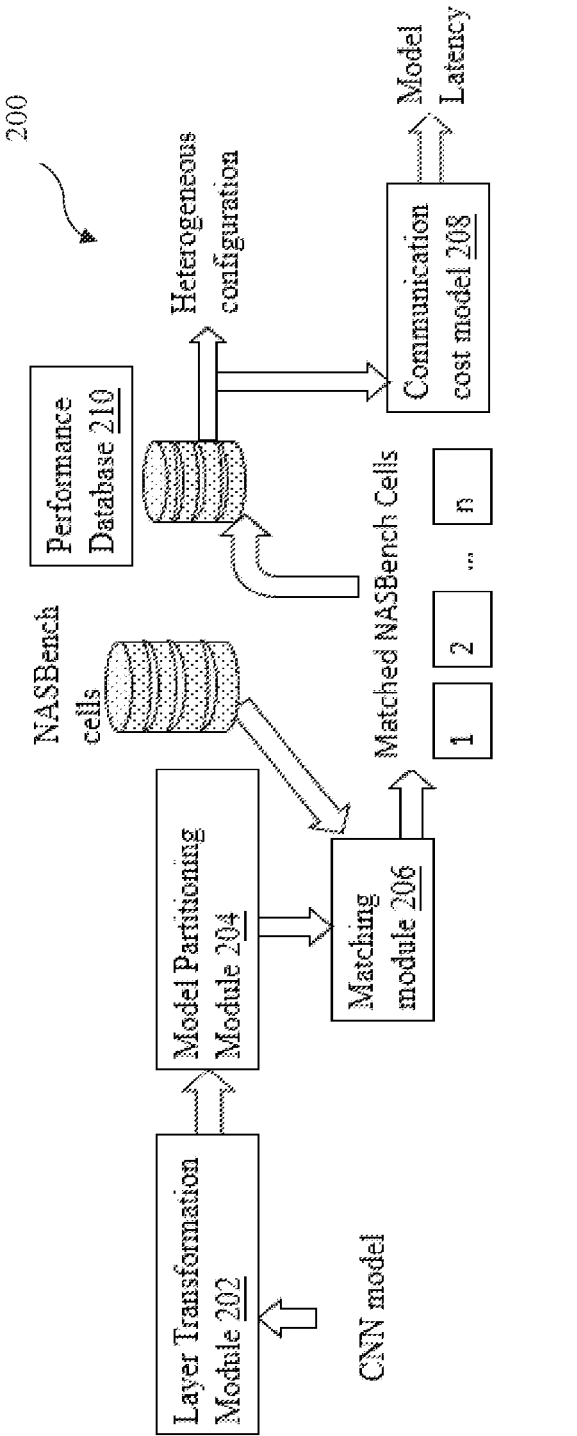
FIG. 2 illustrates a schematic block diagram depicting broad level process flow for latency optimized heterogeneous deployment of convolutional neural network according to some embodiments of the present disclosure.

FIG. 2 illustrates a schematic block diagram depicting a broad level process flow for latency optimized heterogeneous deployment of convolutional neural network according to some embodiments of the present disclosure. The FIG. 2 shows a disclosed framework for latency optimized heterogeneous deployment of the convolutional neural network which includes components such as a layer transformation module 202, a model partitioning module 204, a matching module 206, a communication cost model 208 and a performance database 210. The CNN model is provided as input to the disclosed framework. The layer transformation module 202 extends the support for layers in the CNN model and variations un-supported by a neural architecture search database such as NASBench-201. The layer transformation model helps in the transformation of the CNN model which is used further for latency optimization. The model partitioning module 204 creates partitions of the transformed CNN model. This module uses heuristics to make latency-efficient partitions. The matching module 206 returns NAS-Bench cells that match with the partitions created by model partitioning module 204. The performance database 210 in the memory 104 of the system 100 contains execution time of NASBench cells on target accelerators and the communication cost model 208 contains estimates of communication cost among accelerators. The working of these modules will be detailed along with the description of FIG. 3.

Figure 3B:
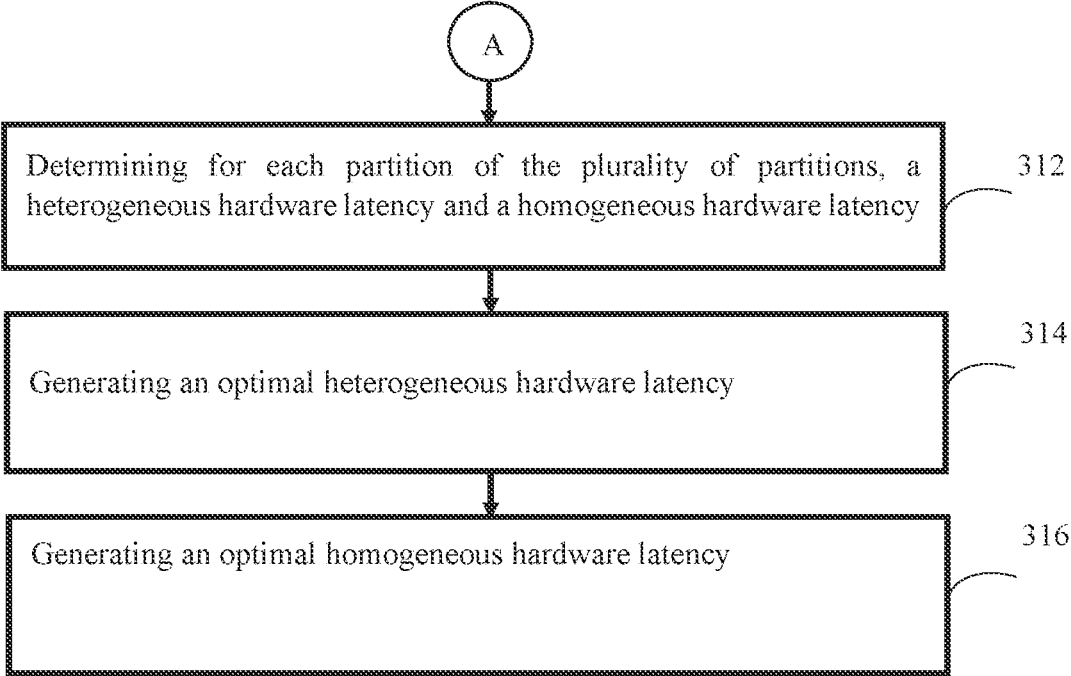

FIG. 3A and FIG. 3B is an exemplary flow diagram for a method 300 for latency optimized heterogeneous deployment of convolutional neural network according to some embodiments of the present disclosure.

In an embodiment, the system 100 comprises one or more data storage devices or the memory 104 operatively coupled to the one or more hardware processor(s) 102 and is configured to store instructions for execution of steps of the method 300 by the processor(s) or one or more hardware processors 102. The steps of the method 300 of the present disclosure will now be explained with reference to the components or blocks of the system 100 as depicted in FIG. 1 and the steps of flow diagram as depicted in FIGS. 3A and 36. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, the one or more hardware processors 102 are configured to receive a Convolutional Neural Network (CNN) model and an image size corresponding to an image is provided to the layer transformation module 202. The CNN model includes a set of layers.

At step 304 of the method 300, the one or more hardware processors 102 are configured to transform the CNN model to obtain a transformed CNN model by the layer transformation module 202. The transformation is based on a performance equivalence between an un-supported layer from the set of layers and a performance layer from a neural architecture search database such as NASBench-201. The neural architecture search database is an external data source. The layer transformation module 202 reads the input CNN model structure and identifies the CNN model structure with layer specifications such as layer name, layer type, filter size, stride, dilation, padding. Further, the layer transformation module 202 identifies the un-supported layers in input CNN model and replaces it with its performance equivalent layer. The disclosed method establishes performance equivalences between NASBench-201 un-supported and supported layer. Performance equivalence denotes those two layers which have approximately same execution time and can be used inter-changeably. The performance equivalence for two layers (layer a and layer b) is obtained using the following steps:

1. Read layer α—type and parameters including filter size, stride, padding, dilation.
2. Measure its execution time on a set of hardware platforms (A100, V100, U280 and Xeon CPU) for different feature sizes (image sizes, for example: 256× 256, 512×512, 1024×1024).
3. Identify a NASBench supported layer with same execution time across hardware platform and feature size. For example, layer b satisfies the requirements.
4. Record layer b as performance equivalent layer for layer a. The execution time is measured after running experiments on the hardware platform.

In case performance equivalent layer is not available, the layer transformation module 202 checks if un-supported layer has dedicated performance database. The layer is retained if its database is available otherwise an advice to create the database is issued and layer performance is not modeled. Thus, the transformed CNN model is created. The algorithm for transforming the CNN model to the transformed CNN model using the layer transformation module 202 is given below:

---

Algorithm 1 Layer Transformation Module

---

1: Inputs: CNN model, image size
2: Outputs: Transformed CNN model (TransModel)
3: NASBench_lay: set of NASBench supported layer
4: lay_db: set of layers having dedicated performance database (e.g., fully connected layer)
5: model_struct=model.read( ) %returns net. struct., layer type, <in,out> ch.
6: Transform un-supported Layers.
7: for all layers in model do
8:  if (model_struct.layer_typ[i] $\notin$ NASBench_lay) then
9:   eq_layer = lat_eq (model_struct.layer[i])
10:    Replace model_struct.layer[i] with eq_layer
11: else
12:  if (model_struct.layer_typ[i] $\in$ lay_db then %if dedicated performance database
13:    Retain model_struct.layer[i]
14:  else
15:    Advise: Create performance database for model_struct.layer[i]
16:  end if
17: end if
18: end for
19: TransModel.write(model_struct)
20: return TransModel

---

Upon obtaining the transformed CNN model at step 304, at step 306 of the method 300, the one or more hardware processors 102 are configured to generate a set of partitions from this transformed CNN model by partitioning the set of layers based on a predefined value using the model partitioning module 204. Each partition of the set of partitions includes one or more layers from the set of layers based on the predefined value The model partitioning module 204 takes the transformed CNN model obtained from the layer transformation module 202 as input. It creates the set of partitions for the CNN model by taking layer groups of sizes 3, 2 and 1.

Figure 4:
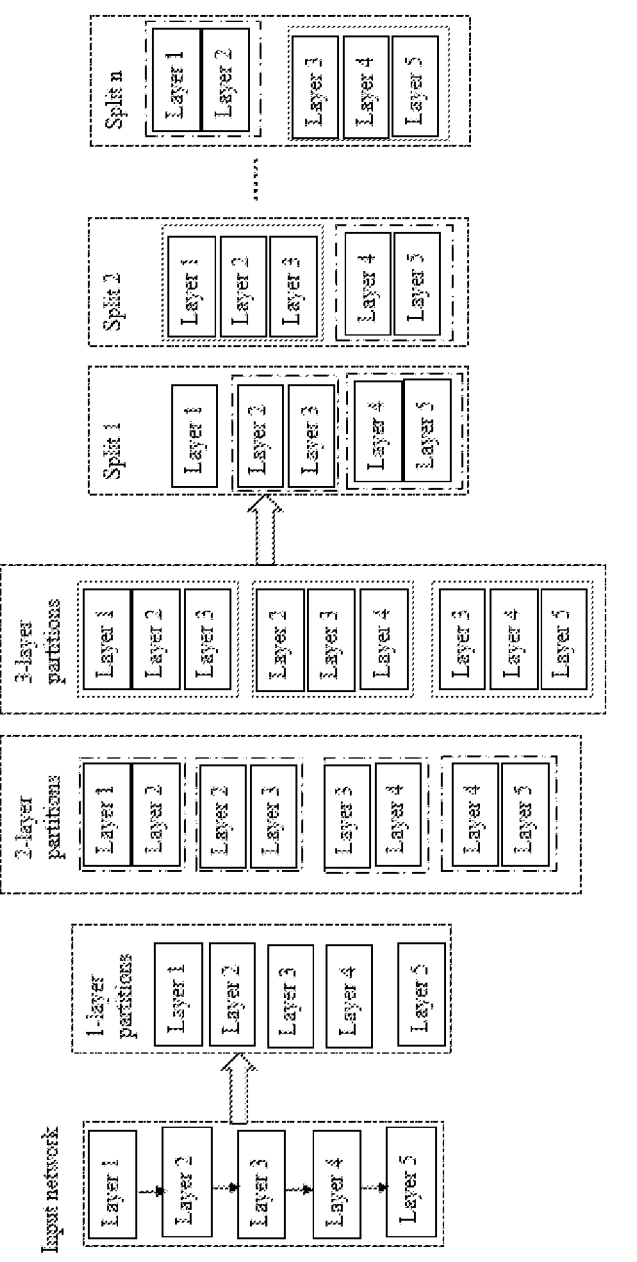
FIG. 4 depicts an example of partitioning a convolutional neural network model into partitions and further combining to form splits according to some embodiments of the present disclosure.

At step 308 of the method 300, the one or more hardware processors 102 are configured to generate a set of splits by combining two or more partitions of the set of partitions. Two or more partitions are combined together to create the set of splits that are representative of a target model. The combination where all layers are considered only once are queued into splits and other combinations are discarded. FIG. 4 depicts an example of partitioning a convolutional neural network model into partitions and further combining to form splits according to some embodiments of the present disclosure. The algorithm for the model partitioning module 304 is given below:

---

Algorithm 2 Model Partitioning Module

---

1: Inputs: Transformed CNN Model (TransModel)
2: Outputs: Split configurations for Transformed CNN model
3: model_struct = TransModel.read( )
4: %Create all possible partitions for model.
5: for all layers in model do
6:   Partn_1lay[j] = read(model_struct.layer[i]) %1-layer partitions
7:   Partn_2lay[j] = read(model_struct.layer[i:i+1]) %2-layer partitions
8:   Partn_3lay[j] = read(model_struct.layer[i:i+2]) %3-layer partitions
9:   i++
10: end for
11: all_com = combination(Partn_1lay, Partn_2lay, Partn_3lay) %Combination of
<1-layer, 2-layer, 3-layer> partitions
12: for all combinations in all com do
13:   if all_com[i] = = len(model_struct.layer) then
14:     Splits.enqueue(all_com[i]) %Keep combinations having same # of layers as TransModel
15:   else
16:     Dequeue all_com[i]
17:   end if
18: end for
19: return Splits

---

At step 310 of the method 300, the one or more hardware processors 102 are configured to determine for each partition of the plurality of partitions, an execution time on each hardware platform among a set of hardware platforms, based on querying the performance database. Each partition is matched with NASBench-201 cells using the matching module 206 and querying cell execution time from the performance database 210. The network partitions from the model partitioning module 204 is passed to the matching module 206. The matching module finds NASBench-201 cells that match the network partitions and returns the matched cells. For a split, after its partitions are matched with NASBench-201 cells, the cell execution time is queried from the performance database 210.

Hence, at step 312 of the method 300, the one or more hardware processors 102 are configured to determine a heterogeneous hardware latency associated with the set of hardware platforms and a homogeneous hardware latency associated with each hardware platform of the set of hardware platforms using the execution time for each partition of the plurality of partitions. The query explained in step 310 returns the partition execution time for all hardware platforms that is accumulated for all partitions which is being considered as heterogeneous hardware latency associated with the set of hardware platforms and as homogeneous hardware latency associated with each hardware platform.

At step 314 of the method 300, the one or more hardware processors 102 are configured to generate an optimal heterogeneous hardware latency associated with the set of hardware platforms from the heterogeneous hardware latency. And further at step 316 of the method 300, the one or more hardware processors 102 are configured to generate an optimal homogeneous hardware latency associated with each hardware platform of the set of hardware platforms from the homogeneous hardware latency. The disclosed method 300 generates homogeneous (or hardware-wise) latency and heterogeneous configuration option. The optimal heterogeneous hardware latency is a minimum heterogeneous hardware latency among the heterogeneous hardware latency. The heterogeneous hardware latency of present partition based on comparison of hardware platforms. The hardware platform with minimum latency is recorded and compared against the hardware platform selected for previous partition. In case both hardware platforms are same, latency is updated with execution time for present partition otherwise the communication cost is also accumulated in latency. The transfer size for communication cost is calculated using feature map dimensions from previous partition using the communication cost model 208. For modeling inter-hardware communication cost, the data transfer between Central Processing Unit (CPU) and Graphics Processing Unit (GPU) (or Field Programmable Gate Arrays (FPGA)) is considered as direct communication, since CPU APIs (Application Programming Interface) support transfers with accelerators connected through Peripheral Component Interconnect express (PCIe). Whereas, because of the lack of access to a unified system containing all three (CPU, FPGA and GPU) hardwares, the communication between GPU and FPGA is routed through CPU. The communication cost is modelled by benchmarking the PCIe3 and PCIe4 communication interfaces for transfer sizes ranging from $2^8$-$2^{32}$ bytes.

The method 300 compares the present and previous heterogeneous latency and updates if present is lesser than previous. The method checks and updates the heterogeneous and homogeneous latency after comparing present latency with last minimum. The present and previous heterogeneous configuration options latencies are compared and updated if present configuration latency is less than the previous configuration latency. The same processing is done in the case of homogeneous hardware latency. The homogeneous hardware latency is compared and updated if present homogeneous hardware latency is less than the previous one for all hardware platforms. The CNN model is deployed to a target hardware platform based on the optimal heterogeneous hardware latency and the optimal homogeneous hardware latency. The algorithm for the disclosed method 300 which is explained through the steps 302 to 314 is given below:

---

Algorithm 3

---

1: Inputs: CNN model, Image size
2: Outputs: Latency on V100, A100, FPGA DPU and Xeon CPU, Heterogeneous
deployment conf. optimized for latency
3: TransModel=Lay_tran(Model,Image size) %from Algorithm 1
4: Splits = Model_part(TransModel) %from Algorithm 2
5: prev_hetero = contains previous heterogeneous deployment conf. with min latency
6: prev_hetero_lat = contains heterogeneous latency for prev_hetero
7: prev_hw = hardware assigned with last partition of a model split
8: for all Splits do
9:   for all Partitions in Splits do
10:     for all NASBench cells do % NASBench cells structure is available as string
11:       if (str_Match (split[i].part[j], cells[k]) == 1) then % string matching
12:         {A100_lat, V100_lat, DPU_lat, CPU_lat} <- Query performance database for cells[k]
13:         hw_lat[0] += A100_lat
14:         hw_lat[1] += V100_lat
15:         hw_lat[2] += DPU_lat
16:         hw_lat[3] += CPU_lat
17:         {min_lat,hw} = min(A100_lat, V100_lat, DPU_lat, CPU_lat)
18:         if (prev_hw != hw) then%comm cost
19:           Lat += min_lat + comm_lat[prev_hw, hw, -continued

| Algorithm 3 |
| --- |

```
tx_size]
20:            hetero_config.add({hw, split[i].part[i]})
21:        else
22:            Lat += min_lat
23:        end if
24:     end if
25:    end for
26:    tx_size = split[i].part[j].out_feat_size
27: end for
28: if (prev_hetero_lat > Lat) then
29:    prev_hetero = hetero_config %update heterogeneous conf.
30:    prev_hetero_lat = Lat %update heterogeneous conf. latency
31: end if
32: for all hardware do
33:    if (prev_hw_lat[m] > hw_lat[m]) then
34:        prev_hw_lat[m] = hw_lat[m] %update homogeneous conf.
latency
35:    end if
36:  end for
37: end for
38: return prev_hw_lat, prev_hetero_lat, prev_hetero
```

EXPERIMENTAL RESULTS: The disclosed framework has been experimented on deployment configurations for four hardware platforms i.e., NVIDIA A100 and V100 GPU, Xilinx FPGA Alveo U280 DPU and Intel Xeon Gold CPU. It has been analyzed for two deployments: homogeneous and heterogeneous where the former denotes single-hardware deployment. The disclosed framework takes CNN network model file (.pb or .pth), input image size, and an optional input of hardware platform for which latency estimation is required. The model file is converted from .pb or .pth to Open Neural Network eXchange (ONNX) format for easy traversal. The framework reads CNN network and extracts structural information comprising of <in,out> channels, layer type and kernel size, which are later used for matching with cell-based latency database. The latency database is available in a pickle format for quick access. The latency is measured and estimated using the disclosed framework for following pre-trained networks: VGG16-bn, Resnet-18, Resnet-50 and text segmentation model CRAFT. The latency is estimated for two image dimensions i.e., 1024×1024×3 and 512×512×3. The performance model accuracy (expressed in %) is derived from measured and estimated latency and is indicative of deviation of later with respect to former. For homogeneous deployment, latency is measured by running the model directly on the respective hardware. On the other hand, heterogeneous deployment measurements includes running the model across hardware by splitting and mapping partitions on suitable hardware platforms. For the communication cost, estimates are used instead of measurements to a server housing A100, V100 an U280 FPGA.

Table 1 and Table 2 shows the latency for homogeneous deployment of target models for RGB images with dimensions 1024×1024 and 512×512, respectively. The disclosed framework exhibits >90% accuracy for all target hardware. Table 3 shows the heterogeneous implementation results. The optimal latency heterogeneous deployment for VGG-16 network is obtained when it is split between GPU and FPGA. For a 1024×1024×3 image, the network is expressed as 7 NASBench-201 cells, out of which 5 are mapped on GPU and remaining on FPGA. The overall accuracy for the performance model is 90%-97%.

TABLE 1

| Network | Image size | A100 | | | V100 | | |
| --- | --- | --- | --- | --- | --- | --- | --- |
| | | M | E | % A | M | E | % A |
| VGG16- | 1024 | 28 | 30.2 | 92.1 | 31 | 32.4 | 95.5 |
| bn | 512 | 9.7 | 10.1 | 95.9 | 10.5 | 11.2 | 93.5 |
| CRAFT | 1024 | 11.2 | 11.7 | 95.4 | 11.5 | 12.3 | 92.7 |
| | 512 | 6.1 | 6.3 | 95.7 | 6.8 | 7.1 | 95.5 |
| ResNet- | 1024 | 8 | 8.7 | 91.2 | 9.5 | 10.3 | 90.8 |
| 18 | 512 | 6.5 | 7.1 | 90.3 | 7.5 | 8.2 | 91.2 |
| ResNet- | 1024 | 18 | 19.1 | 93.8 | 21.4 | 23.3 | 90.7 |
| 50 | 512 | 9.6 | 10.2 | 93.2 | 12.6 | 13.3 | 94.6 |

TABLE 2

| Network | Image size | FPGA DPU | | | Xeon CPU | | |
| --- | --- | --- | --- | --- | --- | --- | --- |
| | | M | E | % A | M | E | % A |
| VGG16- | 1024 | 167 | 180.1 | 92.1 | 1950 | 1970 | 98.7 |
| bn | 512 | 33 | 35.4 | 92.5 | 500 | 537 | 92.5 |
| CRAFT | 1024 | 24.5 | 26.5 | 91.5 | 180 | 195 | 91.6 |
| | 512 | 8 | 8.5 | 92.6 | 55 | 56 | 96.7 |
| ResNet- | 1024 | 11.5 | 12.3 | 92.7 | 430 | 450 | 95.3 |
| 18 | 512 | 9.7 | 10.5 | 91.2 | 115 | 121 | 94.7 |
| ResNet- | 1024 | 35 | 37.6 | 92.4 | 530 | 550 | 96.2 |
| 50 | 512 | 19 | 20.9 | 90.1 | 220 | 235 | 93.1 |

TABLE 3

| Network | Image Dimensions | Total | # of mapped cells #GPU- #FPGA | Latency (in ms) Measured | Estimated | % A |
| --- | --- | --- | --- | --- | --- | --- |
| VGG16- bn | 1024 × 1024 × 3 | 7 | 5A100- 2FPGA | 25 ± 1 | 26.93 | 92.28 |
| | 512 × 512 × 3 | 7 | 4A100- 3FPGA | 9.22 ± 0.5 | 9.51 | 95.86 |
| CRAFT | 1024 × 1024 × 3 | 13 | 6A100- 3FPGA- 4A100 | 10.87 ± 0.5 | 11.36 | 95.13 |
| | 512 × 512 × 3 | 14 | 6A100- 6FPGA- 2A100 | 4.25 ± 0.5 | 4.637 | 90.89 |
| ResNet- 18 | 1024 × 1024 × 3 | 10 | 5A100- 5FPGA | 7.05 ± 0.5 | 7.35 | 95.74 |
| | 512 × 512 × 3 | 10 | 4A100- 6FPGA | 5.28 ± 0.5 | 5.77 | 90.71 |
| ResNet- 50 | 1024 × 1024 × 3 | 18 | 13A100- 5FPGA | 16.55 ± 1.5 | 16.91 | 97.82 |
| | 512 × 512 × 3 | 18 | 8A100- 10FPGA | 8.54 ± 1 | 8.82 | 96.72 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Thus, the embodiments of present disclosure describes the method for low latency deployment of CNN model on heterogeneous architectures. The method optimally partitions the CNN model for deployment on heterogeneous hardware platforms by searching network partition and hardware pair optimized for latency while including communication cost between hardware platforms. The method determines the optimal heterogeneous hardware latency and the optimal homogeneous hardware latency by comparing the latency of partitions across hardware platforms.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving, via one or more hardware processors, a Convolutional Neural Network (CNN) model and an image size corresponding to an image, wherein the CNN model comprises a set of layers;
transforming, via the one or more hardware processors, the CNN model to obtain a transformed CNN model based on a performance equivalence between an un-supported layer from the set of layers and a performance layer from a neural architecture search database;
generating, via the one or more hardware processors, a set of partitions from the transformed CNN model by partitioning the set of layers based on a predefined value, wherein each partition of the set of partitions comprises one or more layers from the set of layers based on the predefined value;
generating, via the one or more hardware processors, a set of splits by combining two or more partitions of the set of partitions, wherein each split of the set of splits comprises a plurality of partitions from the set of partitions;
determining, via the one or more hardware processors, for each partition of the plurality of partitions, an execution time on each hardware platform among a set of hardware platforms, based on querying of a performance database;
determining, via the one or more hardware processors, for each partition of the plurality of partitions, a heterogeneous hardware latency associated with the set of hardware platforms and a homogeneous hardware latency associated with each hardware platform of the set of hardware platforms using the execution time;
generating, via the one or more hardware processors, an optimal heterogeneous hardware latency associated with the set of hardware platforms from the heterogeneous hardware latency; and
generating, via the one or more hardware processors, an optimal homogeneous hardware latency associated with each hardware platform of the set of hardware platforms from the homogeneous hardware latency.

2. The method of claim 1, comprising:
deploying the CNN model to a target hardware platform based on the optimal heterogeneous hardware latency and the optimal homogeneous hardware latency.

3. The method of claim 1, wherein obtaining the transformed CNN model comprises:
identifying, via the one or more hardware processors, the un-supported layer from the set of layers by searching a set of supported layers in the neural architecture search database, wherein the un-supported layer is unavailable in the set of supported layers;

identifying, via the one or more hardware processors, the performance layer corresponding to the un-supported layer; and replacing, via the one or more hardware processors, the un-supported layer with the performance layer to obtain the transformed CNN model.

4. The method of claim 3, wherein identifying the performance layer corresponding to the un-supported layer comprises:

calculating, via the one or more hardware processors, an execution time of the un-supported layer on each hardware platform of the set of hardware platforms based on the image size; and identifying, via the one or more hardware processors, the performance layer by searching the neural architecture search database, wherein an execution time of the performance layer is equal to the execution time of the un-supported layer on each hardware platform of the set of hardware platforms.

5. The method of claim 1, wherein each split of the set of splits comprises at most one of each of the layer of the set of layers.

6. The method of claim 1, wherein determining an execution time for each partition of the plurality of partitions comprises searching each partition in the neural architecture search database.

7. The method of claim 1, wherein the heterogeneous hardware latency comprises at least one of (i) an execution time for the plurality of partitions or (ii) a communication cost for the plurality of partitions calculated using a set of predefined feature dimensions corresponding to the image.

8. The method of claim 1, wherein the optimal heterogeneous hardware latency is a minimum heterogeneous hardware latency among the heterogeneous hardware latency.

9. The method of claim 1, wherein the optimal homogeneous hardware latency is a minimum homogeneous hardware latency among the homogeneous hardware latency associated with each hardware platform.

10. A system, comprising:

a memory storing instructions;

one or more communication interfaces; and one or more hardware processors coupled to the memory via the one or more communication interfaces, wherein the one or more hardware processors are configured by the instructions to:

receive a Convolutional Neural Network (CNN) model and an image size corresponding to an image, wherein the CNN model comprises a set of layers;

transform the CNN model to obtain a transformed CNN model based on a performance equivalence between an un-supported layer from the set of layers and a performance layer from a neural architecture search database;

generate a set of partitions from the transformed CNN model by partitioning the set of layers based on a predefined value, wherein each partition of the set of partitions comprises one or more layers from the set of layers based on the predefined value;

generate a set of splits by combining two or more partitions of the set of partitions, wherein each split of the set of splits comprises a plurality of partitions from the set of partitions;

determine for each partition of the plurality of partitions, an execution time on each hardware platform among a set of hardware platforms, based on querying of a performance database;

determine for each partition of the plurality of partitions, a heterogeneous hardware latency associated with the set of hardware platforms and a homogeneous hardware latency associated with each hardware platform of the set of hardware platforms using the execution time;

generate an optimal heterogeneous hardware latency associated with the set of hardware platforms from the heterogeneous hardware latency; and generate an optimal homogeneous hardware latency associated with each hardware platform of the set of hardware platforms from the homogeneous hardware latency.

11. The system of claim 10, comprising:

deploying the CNN model to a target hardware platform based on the optimal heterogeneous hardware latency and the optimal homogeneous hardware latency.

12. The system of claim 10, wherein obtaining the transformed CNN model comprises:

identify the un-supported layer from the set of layers by searching a set of supported layers in the neural architecture search database, wherein the un-supported layer is unavailable in the set of supported layers;

identify the performance layer corresponding to the un-supported layer; and replace the un-supported layer with the performance layer to obtain the transformed CNN model.

13. The system of claim 12, wherein identifying the performance layer corresponding to the un-supported layer comprises:

calculate an execution time of the un-supported layer on each hardware platform of the set of hardware platforms based on the image size; and identify the performance layer by searching the neural architecture search database, wherein an execution time of the performance layer is equal to the execution time of the un-supported layer on each hardware platform of the set of hardware platforms.

14. The system of claim 10, wherein each split of the set of splits comprises at most one of each of the layer of the set of layers.

15. The system of claim 10, wherein determining an execution time for each partition of the plurality of partitions comprises searching each partition in the neural architecture search database.

16. The system of claim 10, wherein the heterogeneous hardware latency comprises at least one of (i) an execution time for the plurality of partitions or (ii) a communication cost for the plurality of partitions calculated using a set of predefined feature dimensions corresponding to the image.

17. The system of claim 10, wherein the optimal heterogeneous hardware latency is a minimum heterogeneous hardware latency among the heterogeneous hardware latency.

18. The system of claim 10, wherein the optimal homogeneous hardware latency is a minimum homogeneous hardware latency among the homogeneous hardware latency associated with each hardware platform.

19. One or more non-transitory machine-readable information storage mediums comprising one or more instructions which when executed by one or more hardware processors cause:

receiving a Convolutional Neural Network (CNN) model and an image size corresponding to an image, wherein the CNN model comprises a set of layers;

transforming the CNN model to obtain a transformed CNN model based on a performance equivalence between an un-supported layer from the set of layers and a performance layer from a neural architecture search database;

generating a set of partitions from the transformed CNN model by partitioning the set of layers based on a predefined value, wherein each partition of the set of partitions comprises one or more layers from the set of layers based on the predefined value;

generating a set of splits by combining two or more partitions of the set of partitions, wherein each split of the set of splits comprises a plurality of partitions from the set of partitions;

determining for each partition of the plurality of partitions, an execution time on each hardware platform among a set of hardware platforms, based on querying of a performance database;

determining for each partition of the plurality of partitions, a heterogeneous hardware latency associated with the set of hardware platforms and a homogeneous hardware latency associated with each hardware platform of the set of hardware platforms using the execution time;

generating an optimal heterogeneous hardware latency associated with the set of hardware platforms from the heterogeneous hardware latency; and generating an optimal homogeneous hardware latency associated with each hardware platform of the set of hardware platforms from the homogeneous hardware latency.

* * * * *